United States Patent
Kondo

(10) Patent No.: US 8,219,081 B2
(45) Date of Patent: Jul. 10, 2012

(54) IN-VEHICLE WIRELESS COMMUNICATION DEVICE, ROAMING LIST UPDATING SYSTEM, AND METHOD FOR UPDATING ROAMING LIST

(75) Inventor: Hiromasa Kondo, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 332 days.

(21) Appl. No.: 12/588,560

(22) Filed: Oct. 20, 2009

(65) Prior Publication Data
US 2010/0144342 A1 Jun. 10, 2010

(30) Foreign Application Priority Data
Dec. 8, 2008 (JP) ................................. 2008-312072

(51) Int. Cl.
*H04W 4/00* (2009.01)

(52) U.S. Cl. .................... 455/432.1; 455/412.1; 455/415

(58) Field of Classification Search ............... 455/432.1, 455/415, 412.1
See application file for complete search history.

(56) References Cited

U.S. PATENT DOCUMENTS

| 6,999,762 | B2 | 2/2006 | Uchida | |
|---|---|---|---|---|
| 2003/0087642 | A1* | 5/2003 | Mazzara | 455/450 |
| 2003/0148786 | A1* | 8/2003 | Cooper et al. | 455/552 |
| 2003/0211854 | A1* | 11/2003 | Mazzara, Jr. | 455/458 |
| 2004/0009772 | A1* | 1/2004 | Mazzara, Jr. | 455/436 |
| 2004/0214599 | A1 | 10/2004 | Ogino | |
| 2005/0164680 | A1* | 7/2005 | Gould | 455/412.1 |
| 2005/0282489 | A1* | 12/2005 | Kamdar et al. | 455/3.02 |
| 2006/0047415 | A1* | 3/2006 | Groskreutz et al. | 701/201 |
| 2006/0052092 | A1* | 3/2006 | Schwinke et al. | 455/415 |
| 2006/0079219 | A1* | 4/2006 | Nicolini | 455/423 |
| 2007/0155381 | A1* | 7/2007 | Alberth et al. | 455/432.1 |
| 2007/0155421 | A1* | 7/2007 | Alberth et al. | 455/553.1 |
| 2008/0027605 | A1* | 1/2008 | Oesterling | 701/33 |
| 2008/0305789 | A1* | 12/2008 | George et al. | 455/432.1 |
| 2009/0088187 | A1* | 4/2009 | Krause et al. | 455/466 |
| 2009/0247153 | A1* | 10/2009 | Haralson et al. | 455/432.1 |

FOREIGN PATENT DOCUMENTS

| JP | A-2005-033378 | 2/2005 |
|---|---|---|
| JP | A-2007-124324 | 5/2007 |

* cited by examiner

*Primary Examiner* — Jean Gelin
*Assistant Examiner* — Nathan Taylor
(74) *Attorney, Agent, or Firm* — Posz Law Group, PLC

(57) ABSTRACT

A wireless communication unit performs wireless communication with a network of a carrier and receives a roaming list transmitted from the network. A control unit causes a storing unit to store the transmitted roaming list. The control unit sets the stored roaming list to be workable when completing updating of the roaming list and traces a communicable wireless communication system using the workable roaming list. The control unit causes the wireless communication unit to transmit an update request to the network when reception of the transmitted latest roaming list is unsuccessful in the course of the reception and when a predetermined condition is satisfied. The network transmits a latest roaming list to the wireless communication unit in response to reception of the update request.

20 Claims, 10 Drawing Sheets

IN-VEHICLE WIRELESS COMMUNICATION DEVICE, ROAMING LIST UPDATING SYSTEM, AND METHOD FOR UPDATING ROAMING LIST

CROSS REFERENCE TO RELATED APPLICATIONS

This application is based on and incorporates herein by reference Japanese Patent Application No. 2008-312072 filed on Dec. 8, 2008.

FIELD OF THE INVENTION

The present invention relates to an in-vehicle wireless communication device configured to receive a roaming list transmitted from a network of a carrier and store the roaming list. The present invention further relates to a roaming list updating system including the in-vehicle wireless communication device and a vehicle service center. The present invention further relates to a method for updating a roaming list.

BACKGROUND OF THE INVENTION

In general, a wireless communication device such as a cellular-phone device is configured to receive a roaming list transmitted from a network of a carrier and store the transmitted roaming list. The wireless communication device is further configured to trace a wireless communication system (mobile communication system), which is communicable with the wireless communication device, based on the stored roaming list. Thus, the wireless communication device performs a wireless communication with the traced wireless communication system. A specification of the roaming list is defined by IS-683A. The roaming list includes a correspondence between an acquisition index and a channel number. The roaming list further includes a correspondence between a system identifier, the acquisition index, a priority, and the like. As disclosed in JP-A-2005-33378, for example, the wireless communication device selects a channel specified by the roaming list when the wireless communication device is activated or the wireless communication device cannot trace a base station, and thereby the wireless communication device traces a wireless communication system, which corresponds to the selected channel.

It is noted that a configuration of a wireless communication system communicable with the wireless communication device may be changed, for example, in a condition where:

a carrier provides an additional equipment to a conventional wireless communication system or abandons the wireless communication system;

two or more different carriers are unified into one carrier, or one carrier is divided into two or more carriers; and two or more different carriers make a new contract. When such a configuration of a wireless communication system is changed, changed contents of the configuration needs to be reflected on the roaming list. Presently, when a carrier changes a roaming list, a network (network device) of the carrier transmits the roaming list, and thereby a wireless communication device replaces an old roaming list with the transmitted roaming list to update the roaming list.

It is noted that, even though the network of the carrier transmits the roaming list, the wireless communication device may not receive and update the roaming list when the wireless communication device moves to an area out of the communication service, or when the wireless communication device cannot sufficiently receive electric wave of the communication. In view of such a condition, a service provider provides an information service to notify a user of an unsuccessful updating condition of a roaming list. Specifically, the wireless communication device displays that the wireless communication device failed in updating of a roaming list on a display device so as to notify the user of the unsuccessful updating. In this case, the user may operate the wireless communication device and enables transmission of an update request to a network of a carrier for updating the roaming list.

In recent years, an in-vehicle wireless communication device having a mobile communication function is widely used in view of enhancement of a communication service in an interior of a vehicle. However, there is an in-vehicle wireless communication device, which does not have an indication function such as a display device. In a case where updating of a roaming list is unsuccessful, such an in-vehicle wireless communication device, which does not have an indication function such as a display device, cannot display the condition of an unsuccessful update of a roaming list. As a result, such an in-vehicle wireless communication device cannot notify a user of an unsuccessful update of a roaming list. Consequently, the in-vehicle wireless communication device may continue an operation without updating a roaming list. As a result, the in-vehicle wireless communication device may become impossible to perform wireless communication.

SUMMARY OF THE INVENTION

In view of the foregoing and other problems, it is an object of the present invention to produce an in-vehicle wireless communication device configured to appropriately update a roaming list transmitted from a network of a carrier. It is another object of the present invention to produce a roaming list updating system. It is another object of the present invention to produce a method for updating a roaming list.

According to one aspect of the present invention, an in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprises a wireless communication unit configured to perform wireless communication with the network and receive a roaming list transmitted from the network. The in-vehicle wireless communication device further comprises a storing unit configured to store the roaming list received by the wireless communication unit. The in-vehicle wireless communication device further comprises a control unit configured to: cause the storing unit to store the roaming list transmitted from the network when the wireless communication unit receives the roaming list; set the roaming list stored in the storing unit to be workable in response to a determination that a predetermined condition is satisfied; and trace a wireless communication system, which the wireless communication unit is communicable with, using the roaming list, which is set to be workable. The in-vehicle wireless communication device further comprises an updating state storing unit configured to store an updating state, which is in: a completed mode in which reception of a latest roaming list, which is transmitted from the network, is successful to an end of the reception, and updating of the roaming list stored in the storing unit is completed; or a non-completed mode in which reception of the latest roaming list, which is transmitted from the network, is unsuccessful in the course of the reception, and the roaming list stored in the storing unit is in the course of updating. The control unit is configured to determine the updating state stored in the updating state storing unit when the predetermined condition is satisfied, and the control unit is configured to: set the roaming list stored in the storing unit to be workable when determining that the updating state is in the completed mode; and cause the wireless communication unit to transmit an update request to the network when determining that the updating state is in the non-completed mode. According to another aspect of the present invention, an in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprises a wireless communication unit configured to perform wireless communication with the network and receive a roaming list transmitted from the network. The in-vehicle wireless communication device further comprises a storing unit configured to store the roaming list received by the wireless communication unit. The in-vehicle wireless communication device further comprises a control unit configured to: cause the storing unit to store the roaming list transmitted from the network when the wireless communication unit receives the roaming list; set the roaming list stored in the storing unit to be workable in response to a determination that a predetermined condition is satisfied; and trace a wireless communication system, which the wireless communication unit is communicable with, using the roaming list, which is set to be workable.

The in-vehicle wireless communication device further comprises an updating state storing unit configured to store an updating state, which is in: a completed mode in which reception of a latest roaming list, which is transmitted from the network, is successful to an end of the reception, and updating of the roaming list stored in the storing unit is completed; or a non-completed mode in which reception of the latest roaming list, which is transmitted from the network, is unsuccessful from the beginning of the reception, and the roaming list stored in the storing unit is not updated. The control unit is configured to determine the updating state stored in the updating state storing unit when the predetermined condition is satisfied, and the control unit is configured to: set the roaming list stored in the storing unit to be workable when determining that the updating state is in the completed mode; and cause the wireless communication unit to transmit an update request to the network when determining that the updating state is in the non-completed mode and when a present date and time reaches a predetermined regular date and time. According to another aspect of the present invention, an in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprises a wireless communication unit configured to perform wireless communication with the network and receive a roaming list transmitted from the network. The in-vehicle wireless communication device further comprises a storing unit configured to store the roaming list received by the wireless communication unit. The in-vehicle wireless communication device further comprises a control unit configured to: cause the storing unit to store the roaming list transmitted from the network when the wireless communication unit receives the roaming list; set the roaming list stored in the storing unit to be workable in response to a determination that a predetermined condition is satisfied; and trace a wireless communication system, which the wireless communication means is communicable with, using the roaming list, which is set to be workable. The control unit is configured to cause the wireless communication unit to transmit an update request to the network in response to notification of a request for updating a roaming list from a vehicle service center.

According to another aspect of the present invention, a method for updating a roaming list in an in-vehicle wireless communication device via wireless communication with a network of a carrier, the method comprises receiving a latest roaming list from the network. The method further comprises storing an updating state, which is in: i) a completed mode in which the receiving of the latest roaming list is successful to an end of the receiving; or ii) a non-completed mode in which reception of the latest roaming list, which is transmitted from the network, is unsuccessful in the course of the reception. The method further comprises determining whether the updating state stored is in the completed mode or the non-completed mode in response to a determination that a predetermined condition is satisfied. The method further comprises setting the roaming list stored to be workable and tracing a communicable wireless communication system using the roaming list workable when determining that the updating state is in the completed mode. The method further comprises transmitting an update request to the network for receiving a latest roaming list from the network when a result of the determining is that the updating state is in the non-completed mode.

According to another aspect of the present invention, a method for updating a roaming list in an in-vehicle wireless communication device via wireless communication with a network of a carrier, the method comprises receiving a latest roaming list from the network. The method further comprises storing an updating state, which is in: i) a completed mode in which the receiving of the latest roaming list is successful to an end of the receiving; or ii) a non-completed mode in which reception of the latest roaming list, which is transmitted from the network, is unsuccessful from the beginning of the reception, and the roaming list stored in the storing unit is not updated. The method further comprises determining whether the updating state stored is in the completed mode or the non-completed mode in response to a determination that a predetermined condition is satisfied. The method further comprises setting the roaming list stored to be workable and tracing a communicable wireless communication system using the roaming list workable when determining that the updating state is in the completed mode. The method further comprises transmitting an update request to the network for receiving a latest roaming list from the network when a result of the determining is that the updating state is in the non-completed mode and when a present date and time reaches a predetermined regular date and time. According to another aspect of the present invention, a method for updating a roaming list in an in-vehicle wireless communication device via wireless communication with a network of a carrier, the method comprises, receiving a latest roaming list from the network. The method further comprises determining whether a predetermined condition is satisfied. The method further comprises setting the roaming list stored to be workable and tracing a communicable wireless communication system using the roaming list workable in response to a determination that a predetermined condition is satisfied. The method further comprises transmitting an update request to the network for receiving a latest roaming list from the network in response to notification of a request for updating a roaming list from a vehicle service center.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Figure 1:
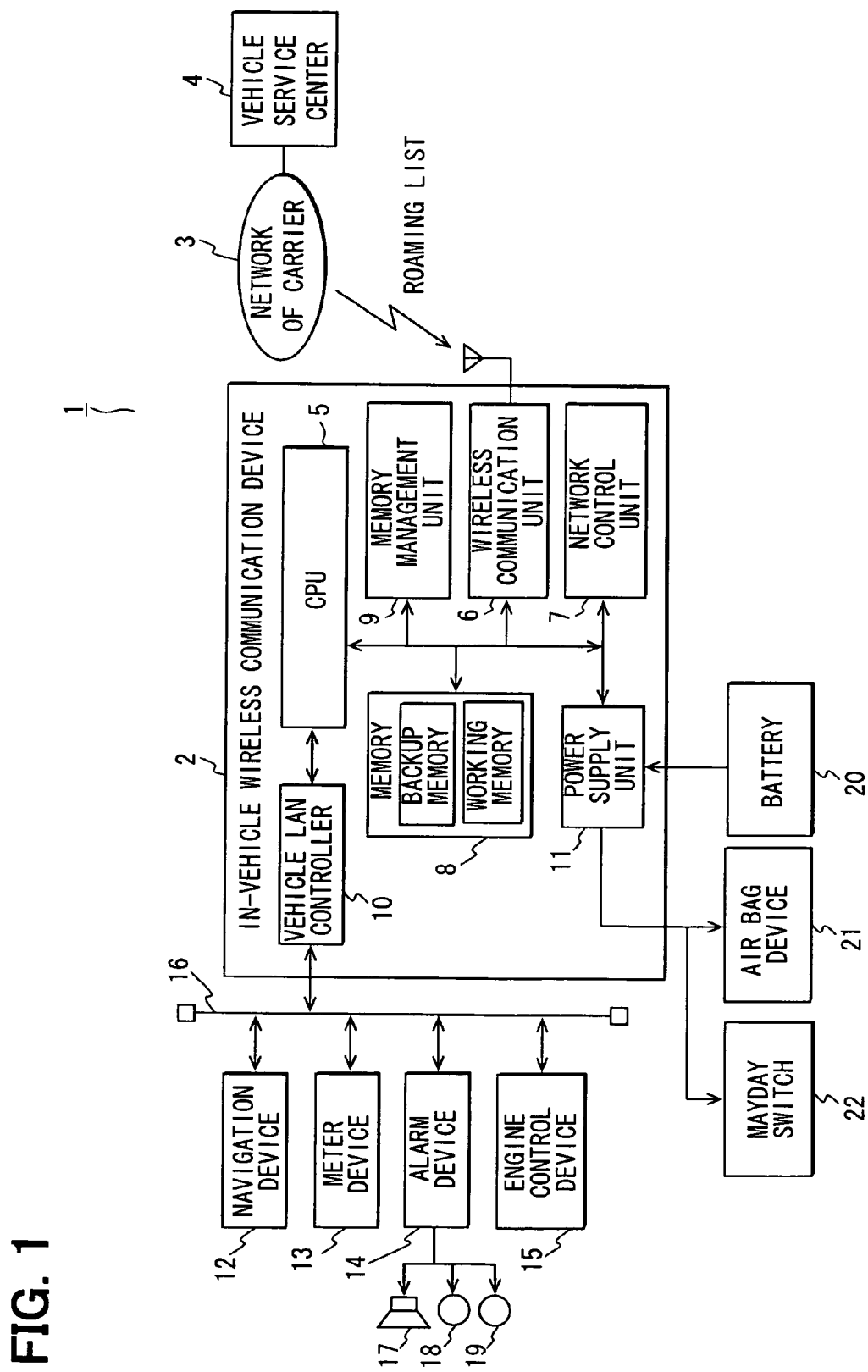
FIG. 1 is a functional block diagram showing a roaming list updating system according to an embodiment of the present invention.

As follows, an embodiment will be described with reference to drawings. A roaming list updating system 1 includes an in-vehicle wireless communication device 2 and a vehicle service center 4. The in-vehicle wireless communication device 2 is located in a vehicle. The vehicle service center 4 is capable of wirelessly communicating with the in-vehicle wireless communication device 2 via a network (network device) 3 of a carrier. The network 3 of the carrier includes a facility such as a mobile phone base station and a base station controller for producing a generally-known mobile phone communication service. The vehicle service center 4 has a function to produce various services, such as a malfunction diagnosis of a vehicle and an information service, to the in-vehicle wireless communication device 2.

The in-vehicle wireless communication device 2 includes a CPU 5 (control unit), a wireless communication unit 6, a network control unit 7, a memory 8 (storing unit), a memory management unit 9 (updating state storing unit), a vehicle LAN controller 10, and a power supply unit 11. The in-vehicle wireless communication device 2 may be installed in a manufactured vehicle. Alternatively, the in-vehicle wireless communication device 2 may be installed, i.e., assembled as one module in a vehicle in the course of manufacturing of the vehicle.

The CPU 5 controls various operations such as a memory operation, a communication operation, and the like of the in-vehicle wireless communication device 2 by executing a control program. The wireless communication unit 6 performs a protocol control and the like with the networks 3 of the carrier, and thereby to carry out a wireless communication. The network control unit 7 analyzes commands of the various signals, which are transmitted from the network 3 of the carrier and received by the wireless communication unit 6.

The memory 8 has two storage areas. One of the two storage areas can be used as a backup memory, and the other of the two storage areas can be used as a working memory. Each of the storage areas can be switched to one of the backup memory and the working memory. The memory management unit 9 manages a state of the storing operation of the memory 8. The vehicle LAN controller 10 is connected with a navigation device 12, a meter device 13, an alarm device 14, and an engine control device 15 via a vehicle LAN 16. The vehicle LAN controller 10 receives and transmits various signals with the devices 12 to 15 and controls the operations of the devices 12 to 15. A horn buzzer 17, a headlight 18, and a hazard 19 are connected to the alarm device 14.

The power supply unit 11 is supplied with electricity from a vehicle battery 20 mounted in the vehicle and configured to convert the supplied electricity to converted electricity of predetermined voltage. The power supply unit 11 supplies the converted electricity to each of the functional blocks 5 to 10 of the vehicle wireless communication device 2, an air bag device 21, and a Mayday switch 22. The power supply unit 11 inputs an accessory signal (ACC signal), which indicates a state of activation and de-activation of an accessory switch (ACC switch), from an ACC switch (predetermined switch), and thereby determines whether the ACC switch is activated or de-activated. When the power supply unit 11 determines that the ACC switch is de-activated, the power supply unit 11 limits the functional blocks supplied with electricity. In this case, the power supply unit 11 operates the in-vehicle wireless communication device 2 in a low-power-consumption state. Alternatively, when the ACC switch is switched and activated, the power supply unit 11 determines that the ACC switch is activated: In this case, the power supply unit 11 supplies electricity to all the functional blocks and operates the in-vehicle wireless communication device 2 in a normal operation state. In the state where the in-vehicle wireless communication device 2 is operated in the low-power-consumption state, the wireless communication unit 6 intermittently performs a standby operation, for example.

In the present structure, a roaming list is transmitted via the network 3 of the carrier by a push communication such as a short message service (SMS). A data volume of the roaming list, which can be transmitted by one packet via the network 3 of the carrier, is beforehand specified. In a case where a data volume of the roaming list, which is to be transmitted, is greater than the specified the data volume of one packet, the network 3 of the carrier divides the roaming list, which is to be transmitted, into multiple roaming lists (roaming list segments, data segments) and transmits the roaming list segments. When a roaming list is divided into the roaming list segments and transmitted via the network 3 of the carrier, the roaming list segments are added with headers, which specify an order (start, middle, end) of the roaming list segments, and transmitted. The vehicle wireless communication device 2 analyzes the header of each of the roaming list segments received via the network 3 of the carrier, and thereby to recognize the order of the received roaming list segments.

A specification of the roaming list is defined by IS-683A. The roaming list includes a correspondence between an acquisition index and a channel number. The roaming list further includes a correspondence between a system identifier, the acquisition index, and a priority, and the like. In a state where the in-vehicle wireless communication device 2 is in the normal operation state, the CPU 5 finds another wireless communication system, which is communicable with the in-vehicle wireless communication device 2, based on the roaming list stored in the working memory at the time point and traces the communicable wireless communication system.

Thereby, the CPU 5 operates the wireless communication unit 6 to perform a wireless communication with the traced wireless communication system. Further, in the condition where the in-vehicle wireless communication device 2 is in the normal operation state, when the wireless communication unit 6 receives a roaming list transmitted via the network 3 of the carrier, the CPU 5 stores the received roaming list in the backup memory. When the de-activated ACC switch is activated, the state of the in-vehicle wireless communication device 2 is changed from the low-power-consumption state to the normal operation state. At this time point, the backup memory is switched to the working memory, and the CPU 5 finds and traces a communicable wireless communication system based on the latest roaming list stored in the presently switched working memory. Thus, the CPU 5 operates the wireless communication unit 6 to perform a wireless communication with the traced wireless communication system.

It is noted that a wireless communication system communicable with the in-vehicle wireless communication device 2 may be changed, for example, in a condition where:

a carrier provides an additional equipment to a conventional wireless communication system or abandons the wireless communication system;

two or more different carriers are unified into one carrier, or one carrier is divided into two or more carriers; and two or more different carriers make a new contract. In view of the change in the communicable wireless communication system, changed contents of the carrier(s) needs to be reflected on the roaming list stored in the in-vehicle wireless communication device 2.

In the present embodiment, the CPU 5 has a function to manage an updating state of the roaming list transmitted via the network 3 of a carrier. More specifically, the memory management unit 9 is notified of the change in the updating state, and thereby sets the updating state of the roaming list to one of:

1) the roaming list is updated (updated mode);
2) the roaming list is in the course of updating (non-completed mode); and
3) updating of the roaming list is completed (completed mode).

Thus, the currently set updating state is stored in the memory management unit 9. It is noted that, when reception of the roaming list transmitted from the network 3 of a carrier is unsuccessful, the in-vehicle wireless communication device 2 does not have a function to notify a user of the unsuccessful reception of the roaming.

Subsequently, operations of the above structure will be described for the following four cases (1) to (4) with reference to FIG. 2 to FIG. 10.

(1) The in-vehicle wireless communication device 2 successfully receives a roaming list to the end of transmission in a normal case.

(2) The in-vehicle wireless communication device 2 fails in reception of a roaming list in the course of the reception in a first malfunction case.

(3) The in-vehicle wireless communication device 2 fails in reception of a roaming list from the beginning of the reception in a second malfunction case.

(4) The in-vehicle wireless communication device 2 is notified of a request of updating of a roaming list from the vehicle service center 4.

Each of the cases (1) to (4) will be described on the premise that the network 3 of a carrier divides a roaming list into three segments and transmits the three segments of the roaming list.

(1) The in-vehicle wireless communication device 2 successfully receives a roaming list to the end of transmission in a normal condition.

Figure 2:
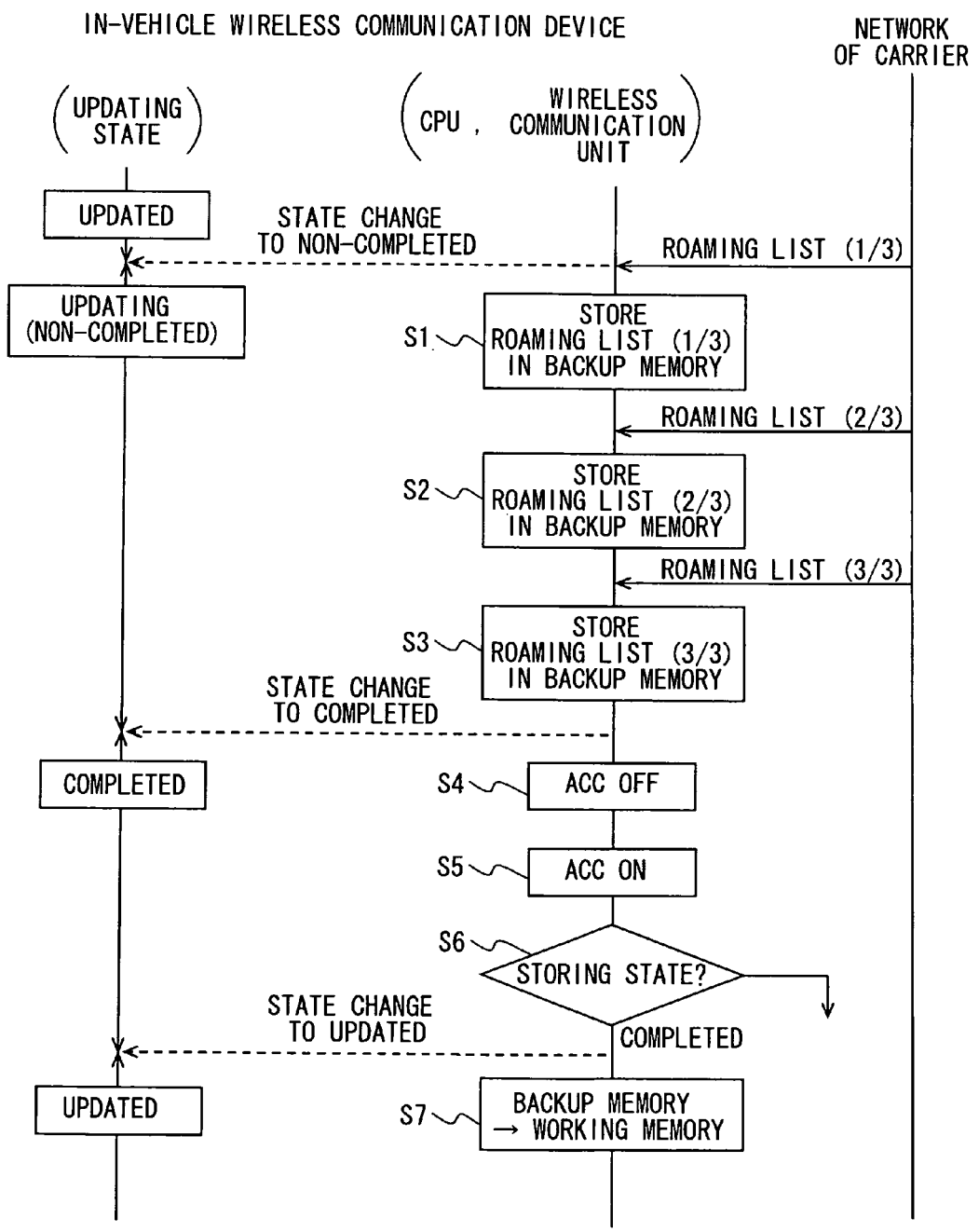
FIG. 2 is a first sequence flow chart showing an updating processings of a roaming list.

The case (1), in which the in-vehicle wireless communication device 2 successfully receives a roaming list to the end of the reception, will be described with reference to FIG. 2.

In the in-vehicle wireless communication device 2, when the CPU 5 determines that the wireless communication unit 6 receives the first segment (1/3) of the roaming list, which is transmitted from the network 3 of a carrier, in a condition where the in-vehicle wireless communication device 2 is in a normal operation state, the CPU 5 notifies the memory management unit 9 of change in the updating state from the updated mode to the non-completed mode. Thereby, the CPU 5 changes the updating state of the roaming list from the updated mode to the non-completed mode. Thus, the CPU 5 stores the received first segment of the roaming list in the backup memory at step S1. Subsequently, when the CPU 5 determines that the wireless communication unit 6 receives the second segment (intermediate segment, 2/3) of the roaming list, which is transmitted from the network 3 of the carrier, the CPU 5 stores the received second segment of the roaming list in the backup memory at step S2.

Further, when the CPU 5 determines that the wireless communication unit 6 receives the third segment (last segment, 3/3) of the roaming list, which is transmitted from the network 3 of the carrier, the CPU 5 stores the received third segment of the roaming list in the backup memory at step S3. Thus, the CPU 5 notifies the memory management unit 9 of state change to the completed mode. Thereby, the CPU 5 changes the updating state of the roaming list from the non-completed mode to the completed mode. Subsequently, when the CPU 5 detects that the ACC switch is manipulated and de-activated at step S4, the CPU 5 in the normal operation state is turned to the low-power-consumption state, while the updating state of the roaming list is set to the completed mode.

Thereafter, when the CPU 5 detects that the ACC switch is manipulated and activated at step S5, the CPU 5 in the low-power-consumption state is turned to the normal operation state. At the present time point, the CPU 5 determines the updating state of the roaming list, which is stored in the memory management unit 9, at step S6. In the present condition, the previous roaming list, which is transmitted from the network 3 of the carrier, was successfully received, and thereby the updating state of the roaming list is changed to the completed mode. Therefore, the CPU 5 determines that the updating state of the roaming list is in the completed mode. Thus, the CPU 5 switches the backup memory to the working memory at step S7 and notifies the memory management unit 9 of the state change to the updated mode. Thereby, the CPU 5 changes the updating state of the roaming list from the completion mode to the updated mode. Subsequently, the CPU 5 traces a communicable wireless communication system based on the latest roaming list stored in the current working memory.

(2) The in-vehicle wireless communication device 2 fails in reception of a roaming list in the course of the reception.

Figure 3:
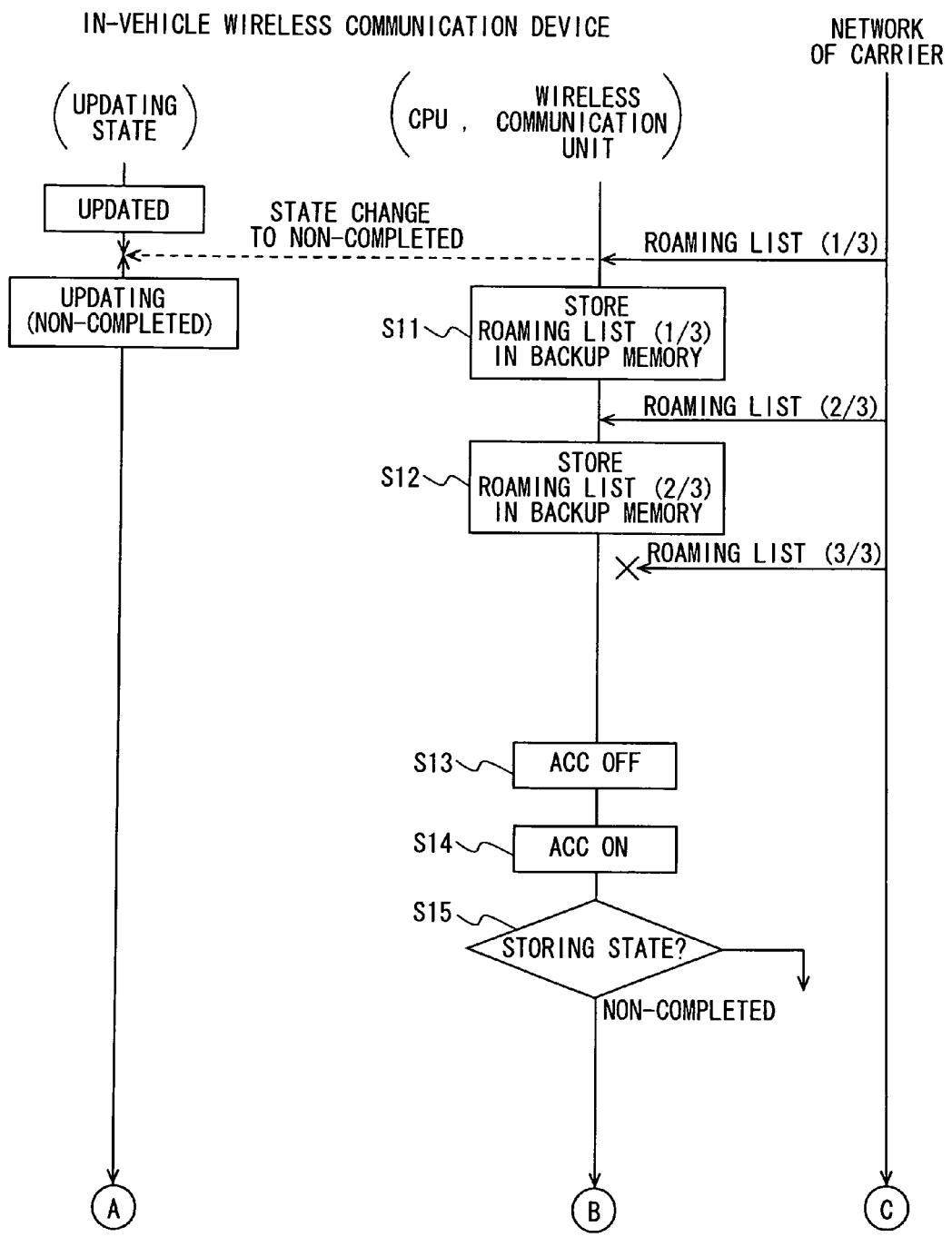
FIG. 3 is a second sequence flow chart showing the updating processings of the roaming list.
Figure 4:
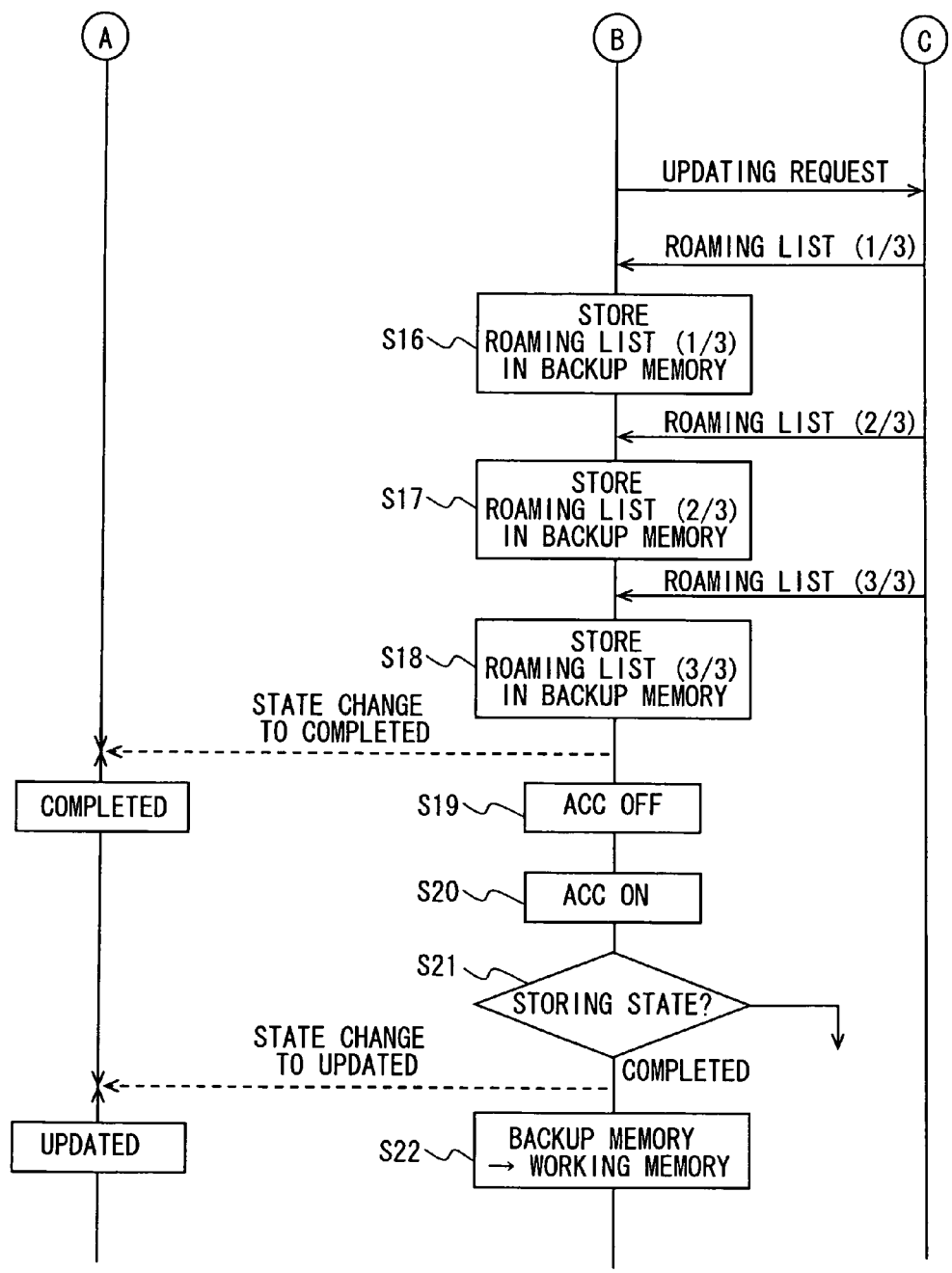
FIG. 4 is a third sequence flow chart showing the updating processings of the roaming list.

Next, the case (2), in which the in-vehicle wireless communication device 2 fails in reception of a roaming list in the course of the reception, will be described with reference to FIGS. 3, 4.

In the in-vehicle wireless communication device 2, when the CPU 5 determines that the wireless communication unit 6 receives the first segment (1/3) of the roaming list, which is transmitted from the network 3 of a carrier, in a condition where the in-vehicle wireless communication device 2 is in the normal operation state, the CPU 5 notifies the memory management unit 9 of change in the updating state from the updated mode to the non-completed mode. Thereby, the CPU 5 changes the updating state of the roaming list from the updated mode to the non-completed mode. Thus, the CPU 5 stores the received first segment of the roaming list in the backup memory at step S11.

When the CPU 5 determines that the wireless communication unit 6 receives the second segment (2/3) of the roaming list in the course of being transmitted from the network 3 of the carrier, the CPU 5 stores the roaming list, which is in the course of reception in the backup memory, at step S12. For example, when the vehicle, which has the in-vehicle wireless communication device 2, moves to an area out of the communication service, alternatively when the wireless communication unit 6 cannot sufficiently receive electric wave of the communication, the wireless communication unit 6 may not receive the third segment (3/3) of the roaming list, which is finally transmitted from the network 3 of the carrier. When the CPU 5 determines that the wireless communication unit 6 do not receive the third segment (3/3) of the roaming list, dissimilarly to the first case (1), the CPU 5 maintains the updating state at the non-completed mode. In this case, the CPU 5 does not notify the memory management unit 9 of the state change to the completed mode and does not change the updating state of the roaming list from the non-completed mode to the completed mode.

The CPU 5 counts (clocks) a waiting time for which the CPU 5 waits reception of the roaming list. For example, the CPU 5 may start counting of the waiting time at a time point, at which the CPU 5 receives a segment of the roaming list immediately before. In this case, the CPU 5 determines that the CPU 5 fails in reception of the segment of the roaming list via the wireless communication unit 6 when the CPU 5 cannot receive the segment of the roaming in a condition where the clocked waiting time exceeds a predetermined time. Subsequently, when the CPU 5 detects that the ACC switch is manipulated and de-activated at step S13, the CPU 5 in the normal operation state is turned to the low-power-consumption state, while the updating state of the roaming list is set to the non-completed mode, dissimilarly to the case (1).

Thereafter, when the CPU 5 detects that the ACC switch is manipulated and activated at step S14, the CPU 5 is switched from the low-power-consumption state to the normal operation state. At this time point, the CPU 5 determines the updating state of the roaming list stored in the memory management unit 9 at step S15. As described above, in this case, the CPU 5 fails the reception of the segment of the roaming list, which is transmitted from the network 3 of the carrier, in the course of the reception. Therefore, the CPU 5 determines that the updating state of the roaming list is not changed to the completed mode but the non-completed mode. That is, the CPU 5 determines that the updating state of the roaming list is still in the course of the updating. Thus, the CPU 5 determines that the updating state of the roaming list is in the non-completed mode, dissimilarly to the case (1). Thus, the CPU 5 causes the wireless communication unit 6 to transmit an update request to the network 3 of the carrier, without notifying the memory management unit 9 of a state change to the updated mode.

In this way, the network 3 (network device) of the carrier receives the update request, which is transmitted from the in-vehicle wireless communication device 2. Thereby, the network 3 of the carrier determines that the in-vehicle wireless communication device 2 fails in the reception of the roaming list. Thus, the network 3 of the carrier again transmits the roaming list to the in-vehicle wireless communication device 2, which originally transmitted the update request.

In the in-vehicle wireless communication device 2, when the CPU 5 determines that the wireless communication unit 6 receives the first segment (1/3) of the roaming list, which is transmitted from the network 3 of the carrier, the CPU 5 stores the received first segment of the roaming list in the backup memory at step S16, without notifying the memory management unit 9 of state change to the non-completed mode, in which the CPU 5 is in the course of reception of the roaming list. Subsequently, when the CPU 5 determines that the wireless communication unit 6 receives all the segments of the roaming list, which is again transmitted from the network 3 of the carrier, the CPU 5 stores all the received segments of the roaming list in the backup memory at steps S16 to S18. Thus, the CPU 5 notifies the memory management unit 9 of the state change to the completed mode. Thereby, the CPU 5 changes the updating state of the roaming list from the non-completed mode to the completed mode. Subsequently, at steps S19 to S22, the CPU 5 performs the same processings as steps S4 to S7 described in the case (1).

In the present case, when the CPU 5 determines that the CPU 5 fails in reception of the segments of roaming list in the course of the reception, the CPU 5 causes the wireless communication unit 6 to transmit again an update request to the network 3 of the carrier thereby to receive the roaming list again. It is noted that, when the CPU 5 repeatedly determines that the CPU 5 fails in reception of the segments of roaming list in the course of the reception, the CPU 5 repeatedly causes the wireless communication unit 6 to transmit the update request to the network 3 of the carrier thereby to receive the roaming list again for a predetermined times or within a predetermined time period.

(3) The in-vehicle wireless communication device 2 fails in reception of a roaming list from the beginning of the reception.

Figure 5:
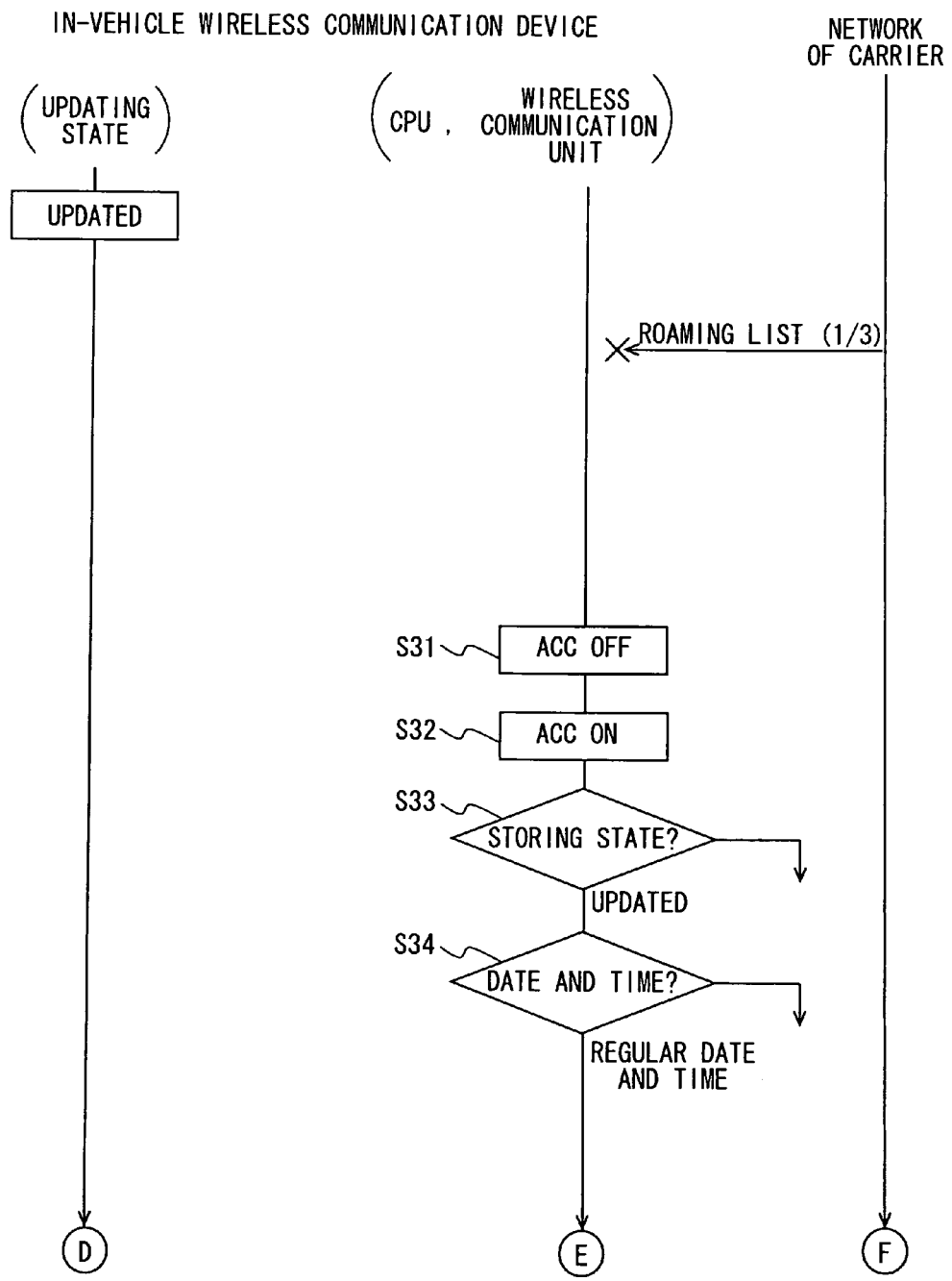
FIG. 5 is a fourth sequence flow chart showing the updating processings of the roaming list.
Figure 6:
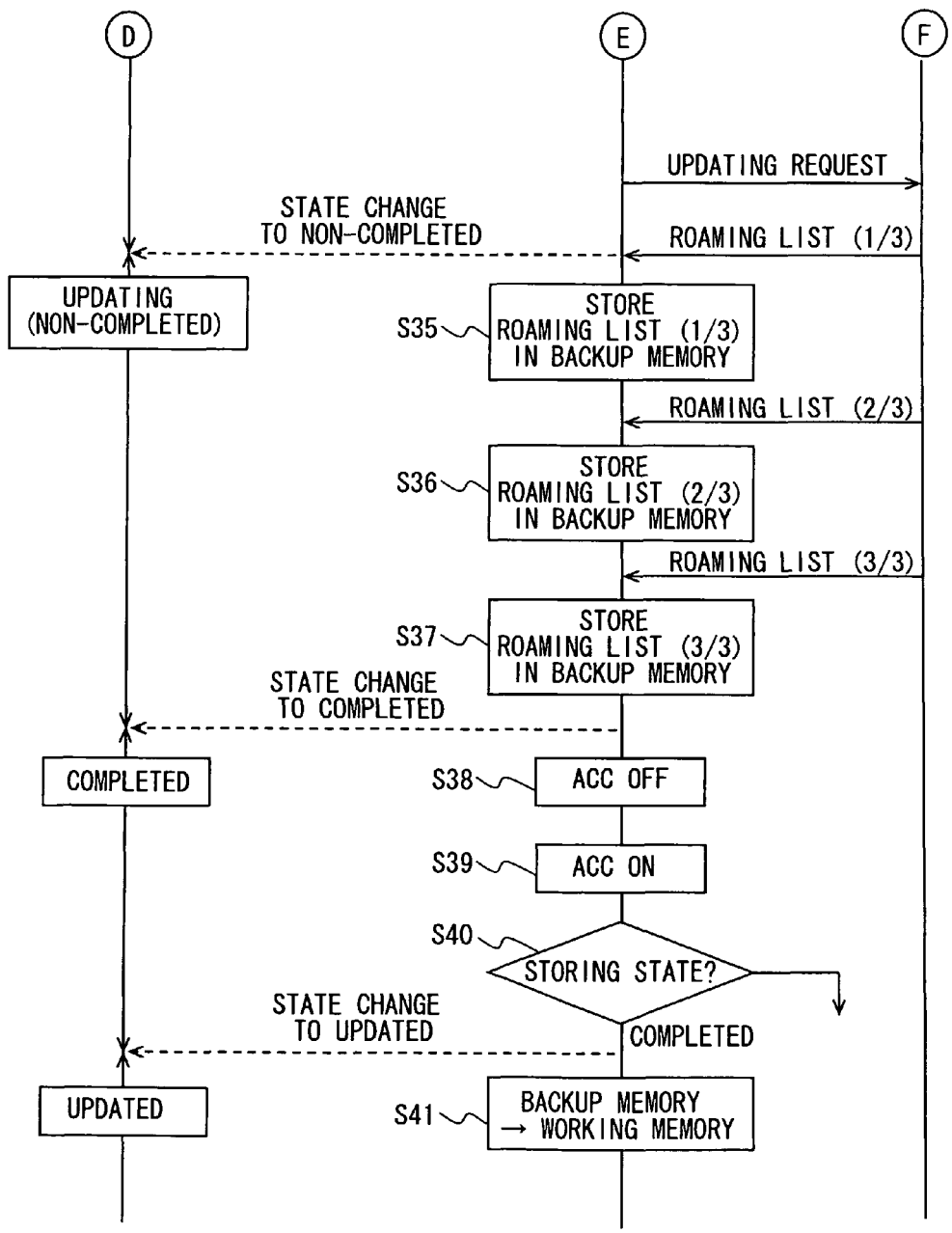
FIG. 6 is a fifth sequence flow chart showing the updating processings of the roaming list.
Figure 7:
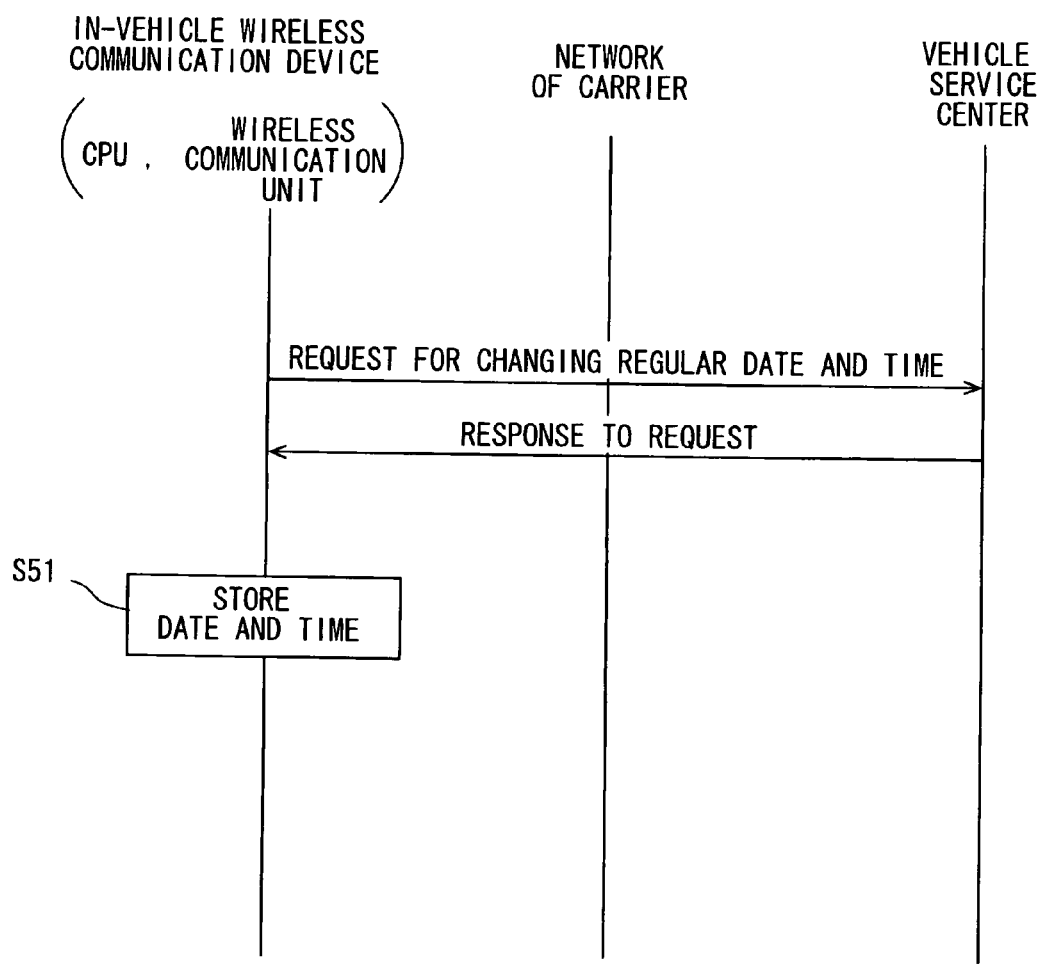
FIG. 7 is a sixth sequence flow chart showing the updating processings of the roaming list.

Next, the case (2), in which the in-vehicle wireless communication device 2 fails in reception of a roaming list from the beginning of the reception, will be described with reference to FIGS. 5 to 7.

For example, when the vehicle, which has the in-vehicle wireless communication device 2, moves to an area out of the communication service, alternatively when the wireless communication unit 6 cannot sufficiently receive electric wave of the communication, the wireless communication unit 6 may not receive the first segment (1/3) of the roaming list, which is transmitted from the network 3 of the carrier. When the wireless communication unit 6 cannot receive the first segment (1/3) of the roaming list transmitted from the network 3 of the carrier, dissimilarly to the case (1), the CPU 5 maintains the updating state of the roaming at the updated mode, without notifying the memory management unit 9 of the state change to the completed mode or non-completed mode. Subsequently, when the CPU 5 detects that the ACC switch is manipulated and de-activated at step S31, the CPU 5 in the normal operation state is turned to the low-power-consumption state, while the updating state of the roaming list is set to the updated mode, dissimilarly to the case (1).

Thereafter, when the CPU 5 detects that the ACC switch is manipulated and activated at step S32, the CPU 5 is switched from the low-power-consumption state to the normal operation state. At this time point, the CPU 5 determines the updating state of the roaming list stored in the memory management unit 9 at step S33. As described above, in this case, the CPU 5 fails the reception of the segment of the roaming list, which is transmitted from the network 3 of the carrier, from the beginning of the reception. Therefore, the CPU 5 determines that the updating state of the roaming list is not changed to the completed mode but the updated mode. That is, the CPU 5 determines that the updating state of the roaming list is in the updated mode. Thus, the CPU 5 determines that the updating state of the roaming list is in the updated mode, dissimilarly to the case (1). Thus, the CPU 5 determines whether the date and time at the time point is a predetermined regular date and time, without notifying the memory management unit 9 of a state change to the updated mode, at step S34. When the CPU 5 determines that the date and time at the time point is the predetermined regular date and time, the CPU 5 causes the wireless communication unit 6 to transmit an update request to the network 3 of the carrier.

In this way, the network 3 (network device) of the carrier receives the update request, which is transmitted from the in-vehicle wireless communication device 2. Thereby, the network 3 of the carrier also determines that the in-vehicle wireless communication device 2 fails in the reception of the roaming list. Thus, the network 3 of the carrier again transmits the roaming list to the in-vehicle wireless communication device 2, which originally transmitted the update request.

In the in-vehicle wireless communication device 2, when the CPU 5 determines that the wireless communication unit 6 receives the first segment (1/3) of the roaming list, which is transmitted from the network 3 of the carrier, the CPU 5 notifies the memory management unit 9 of state change to the non-completed mode at step S35. Thereby, the CPU 5 changes the updating state of the roaming list from the updated mode to the non-completed (in the course of the updating). That is, the CPU 5 stores the received first segment of the roaming list in the backup memory at step S35. When the CPU 5 determines that the wireless communication unit 6 receives all the segments of the roaming lists again retransmitted from the network 3 of the carrier, the CPU 5 stores all the received segments of the roaming list in the backup memory at steps S35 to S37. Subsequently, the CPU 5 notifies the memory management unit 9 of the state change to the completed mode and thereby changing the updating state of the roaming list from the non-completed mode to the completed mode. Thereafter, at steps S38 to S41, the CPU 5 performs the same processings as steps S4 to S7 of the case (1).

In the present case, when the CPU 5 determines that the CPU 5 fails in reception of the segments of roaming list from the beginning of the reception, the CPU 5 causes the wireless communication unit 6 to transmit again an update request to the network 3 of the carrier thereby to receive the roaming list again, similarly to the case, in which it is determined that the CPU 5 fails in reception of the roaming list in the course of the reception. It is noted that, when the CPU 5 repeatedly determines that the CPU 5 fails in reception of the segment of roaming list in the beginning of the reception, the CPU 5 repeatedly causes the wireless communication unit 6 to transmit the update request to the network 3 of the carrier thereby to receive the roaming list again for a predetermined times or within a predetermined time period.

It is noted that the CPU 5 may cause the wireless communication unit 6 to transmit a request for changing the predetermined regular date and time to the vehicle service center 4. In this case, when the wireless communication unit 6 receives the predetermined regular date and time transmitted from the vehicle service center 4, the CPU 5 stores the predetermined regular date and time, which is specified by a response to the request, at step S51. Thereby, the CPU 5 is capable of storing the predetermined regular date and time specified by the vehicle service center 4 and determining whether the present date and time is the predetermined regular date and time, as described above.

(4) The in-vehicle wireless communication device 2 is notified of a request of updating of a roaming list from the vehicle service center 4.

Figure 8:
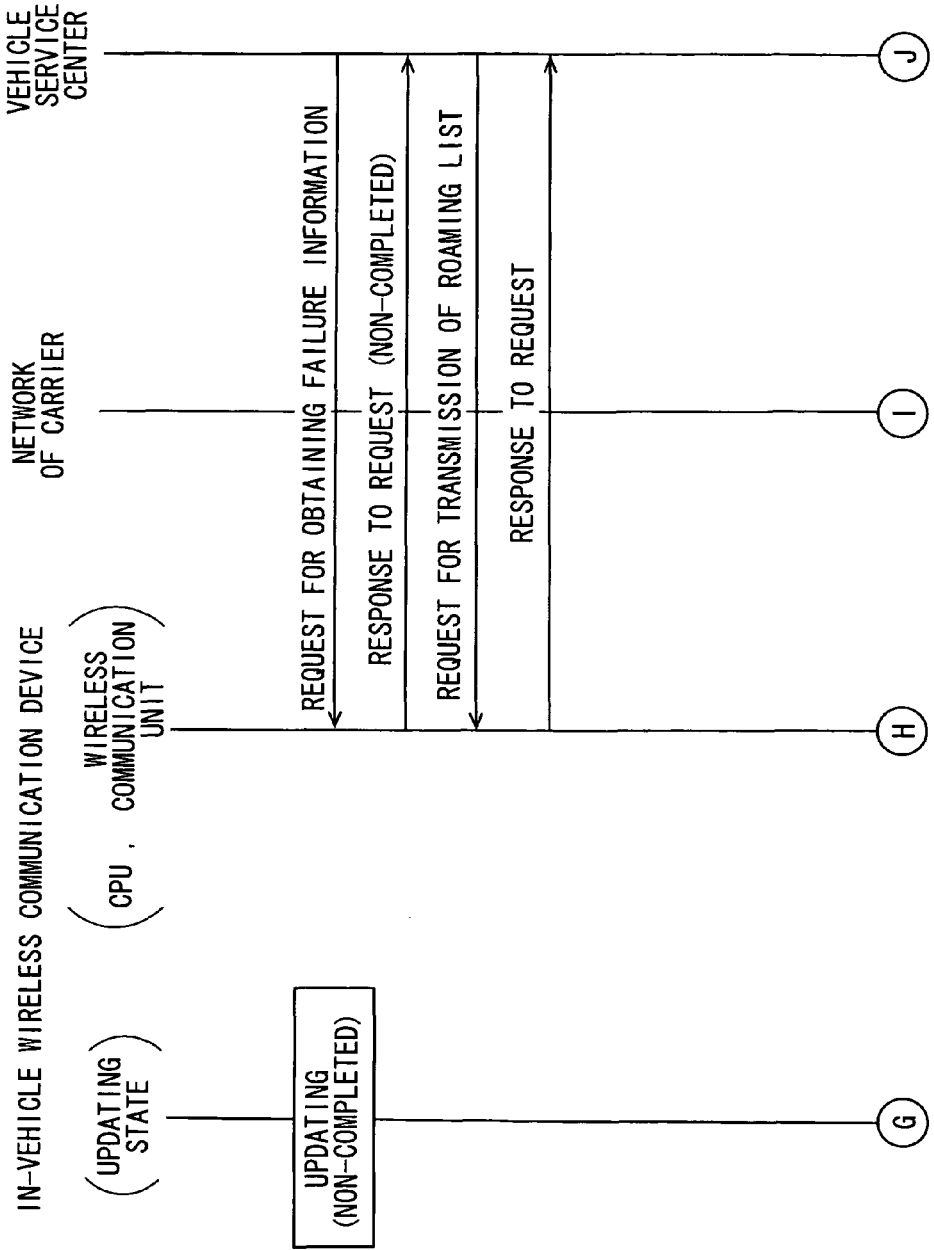
FIG. 8 is a seventh sequence flow chart showing the updating processings of the roaming list.
Figure 9:
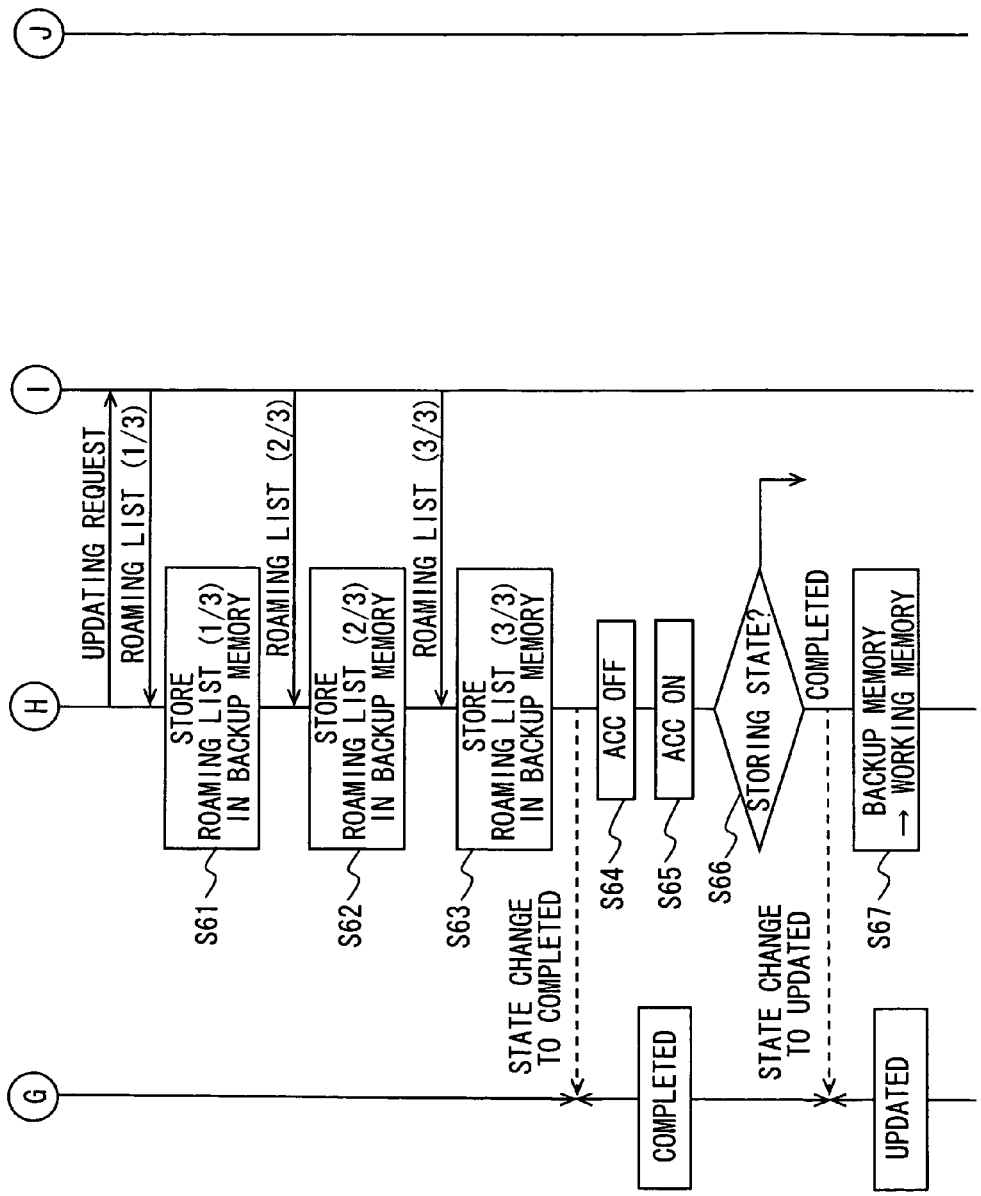
FIG. 9 is an eighth sequence flow chart showing the updating processings of the roaming list.

As follows, the case, in which the in-vehicle wireless communication device 2 is notified of a request for updating the roaming list from the vehicle service center 4, will be described with reference to FIGS. 8 and 9.

The vehicle service center 4 regularly transmits a request for obtaining failure information to the in-vehicle wireless communication device 2 in order to perform a malfunction diagnosis of the vehicle. In the in-vehicle wireless communication device 2, when the CPU 5 determines that the wireless communication unit 6 receives a request for obtaining failure information from the vehicle service center 4, the CPU 5 obtains failure information stored as a failure history by the time point. The failure information associates date and time, in which a failure occurred, with a content of the failure. Thus, the CPU 5 causes the wireless communication unit 6 to transmit a response, which includes the obtained failure information, to the vehicle service center 4. In this case, the CPU 5 determines the updating state of the roaming list stored in the memory management unit 9 at the time point. When the CPU 5 determines that the updating state of the roaming list is non-completed mode (updating), the CPU 5 causes the wireless communication unit 6 to transmit the response, which is to the request for obtaining failure information, to the vehicle service center 4. In addition, the CPU 5 simultaneously causes the wireless communication unit 6 to transmit that the updating state of the roaming list is non-complete mode (updating) to the vehicle service center 4.

In this way, the vehicle service center 4 receives the response, which is to the request for obtaining failure information, and the information that the updating state of the roaming list is in the non-completed mode (updating) from the in-vehicle wireless communication device 2. Thereby, the vehicle service center 4 transmits a request for updating the roaming list to the in-vehicle wireless communication device 2. In the in-vehicle wireless communication device 2, when the CPU 5 determines that the wireless communication unit 6 receives the request (roaming list updating request) for updating the roaming list from the vehicle service center 4, the CPU 5 causes the wireless communication unit 6 to transmit a response (roaming list updating response) to the request to the vehicle service center 4. Further, the CPU 5 causes the wireless communication unit 6 to transmit an update request to the network 3 of the carrier.

In this way, the network 3 (network device) of the carrier receives the update request, which is transmitted from the in-vehicle wireless communication device 2. In this case, the network 3 of the carrier does not determine that the in-vehicle wireless communication device 2 fails in the reception of the roaming list. Even though, the network 3 of the carrier again transmits the roaming list to the in-vehicle wireless communication device 2, which originally transmitted the update request.

In the in-vehicle wireless communication device 2, when the CPU 5 determines that the wireless communication unit 6 receives the first segment (1/3) of the roaming list, which is transmitted from the network 3 of the carrier, the CPU 5 stores the received first segment of the roaming list in the backup memory at step S61, without notifying the memory management unit 9 of state change to the non-completed mode (updating), in which the CPU 5 is in the course of reception of the roaming list. When the CPU 5 determines that the wireless communication unit 6 receives all the segments of the roaming lists again retransmitted from the network 3 of the carrier, the CPU 5 stores all the received segments of the roaming list in the backup memory at steps S61 to S63. Subsequently, the CPU 5 notifies the memory management unit 9 of the state change to the completed mode and thereby changing the updating state of the roaming list from the non-completed mode to the completed mode. Thereafter, at steps S64 to S67, the CPU 5 performs the same processings as steps S4 to S7 of the case (1).

That is, even when the CPU 5 does not determine that the in-vehicle wireless communication device 2 fails in the reception of the roaming list in the course of the reception, the CPU 5 causes the wireless communication unit 6 to transmit the update request to the network 3 of the carrier, in response to reception of the roaming list update request transmitted from the vehicle service center 4. Thereby, the CPU 5 causes the in-vehicle wireless communication device 2 to receive the roaming list spontaneously. As described above, the vehicle service center 4 transmits the roaming list update request to the in-vehicle wireless communication device 2 when the updating state of the roaming list of the in-vehicle wireless communication device 2 is non-completed (updating). Alternatively, the vehicle service center 4 may transmit the roaming list update request to the in-vehicle wireless communication device 2 when the updating state of the roaming list of the in-vehicle wireless communication device 2 is the updated mode or the completed mode. The vehicle service center 4 may transmit the roaming list update request to the in-vehicle wireless communication device 2 when the updating state of the roaming list of the in-vehicle wireless communication device 2 is any mode.

Figure 10:
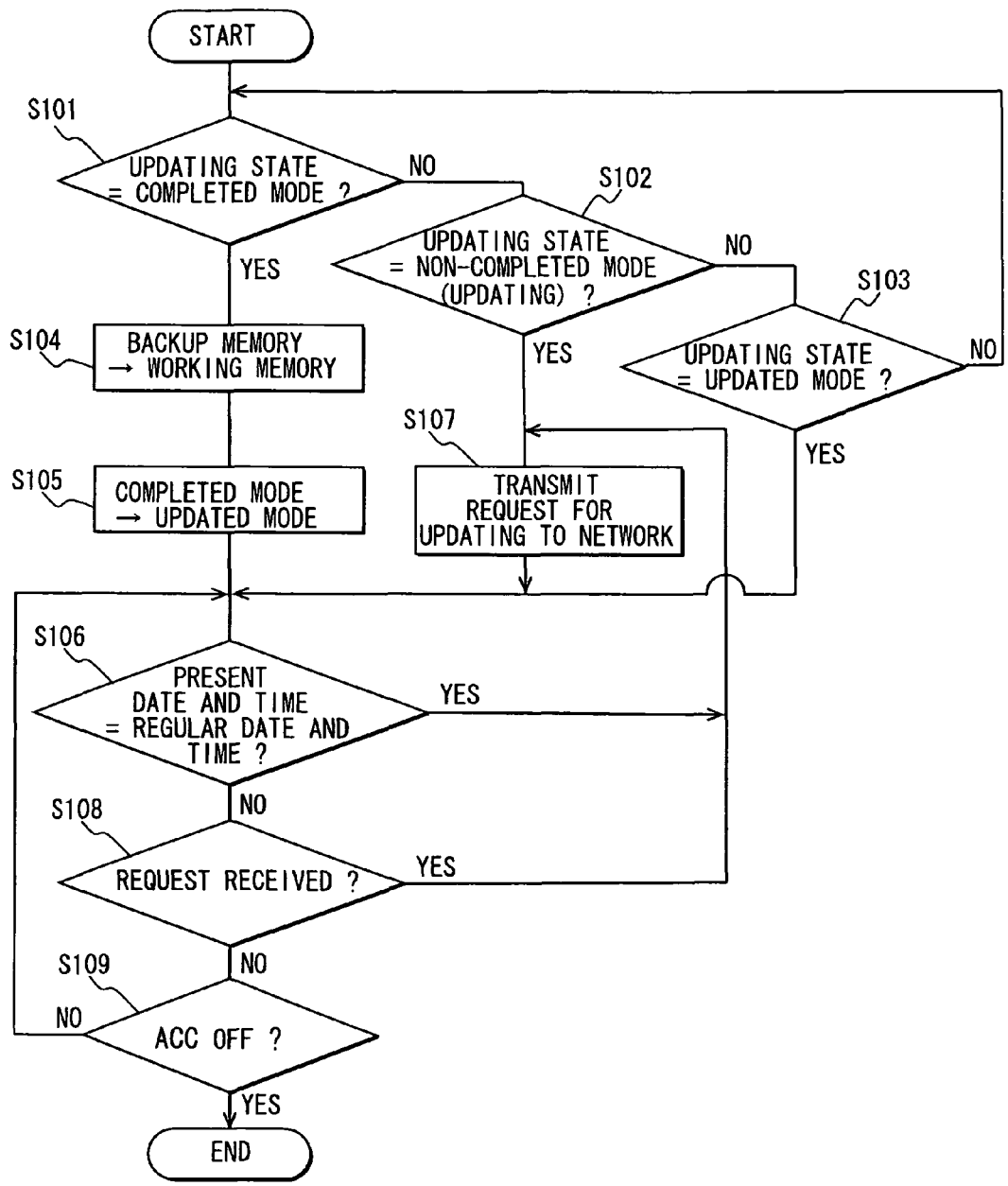
FIG. 10 is a flowchart showing processings performed when a CPU determines that an ACC switch is activated.

FIG. 10 is a flow chart showing processings performed when the CPU 5 determines that the ACC switch is activated. When the CPU 5 determines that the ACC switch is activated, at steps S101 to S103, the CPU 5 determines whether the updating state of the roaming list is one of the completed mode, non-completed mode (updating), and the updated mode at the time point. When the CPU 5 determines that the updating state of the roaming list at the time point is the completed mode, step S101 makes a positive determination. In this case, the CPU 5 changes the backup memory to the working memory at step S104. Further, the CPU 5 notifies the memory management unit 9 of the state change to the updated mode. Thereby, the CPU 5 changes the updating state of the roaming list from the completed mode to the updated mode at step S105. Further, the CPU 5 determines whether the date and time at the time point reaches the predetermined regular date and time at step S106.

When the CPU 5 determines that the updating state of the roaming list at the time point is non-completed (updating), step S102 makes a positive determination. In this case, the CPU 5 causes the wireless communication unit 6 to transmit the update request to the network 3 of the carrier. Thereby, the CPU 5 causes the in-vehicle wireless communication device 2 to receive the roaming list again at step S107. Further, when the CPU 5 determines that the updating state of the roaming list at the time point is the updated mode, step S103 makes a positive determination. In this case, the CPU 5 determines whether the date and time at the time point reaches the predetermined regular date and time at step S106.

When the CPU 5 determines that the date and time at the time point reaches the predetermined regular date and time, step S106 makes a positive determination. In this case, the CPU 5 causes the wireless communication unit 6 to transmit the update request to the network 3 of the carrier. Thereby, the CPU 5 causes the in-vehicle wireless communication device 2 to receive the roaming list again at step S107. Alternatively, when the CPU 5 determines that the date and time at the time point does not reach the predetermined regular date and time, step S106 makes a negative determination. In this case, the CPU 5 determines whether the wireless communication unit 6 receives the roaming list update request transmitted from the vehicle service center 4 at step S108. When the CPU 5 determines that the wireless communication unit 6 receives the roaming list update request transmitted from the vehicle service center 4, step S108 makes a positive determination. In this case, the CPU 5 causes the wireless communication unit 6 to transmit the updating response of the roaming list to the vehicle service center 4. Thereby, the CPU 5 causes the wireless communication unit 6 to transmit the update request to the network 3 of the carrier to receive the roaming list again at step S107.

The CPU 5 determines whether the ACC switch is deactivated at step S109. Unless the CPU 5 determines that the ACC switch is deactivated, step S109 makes a negative determination, and the CPU 5 repeats the processings of steps S106 and S107. In the present processings, unless the ACC switch is deactivated, the CPU 5 causes the wireless communication unit 6 to transmit the update request to the network 3 of the carrier whenever the wireless communication unit 6 receives the roaming list update request from the vehicle service center 4 or whenever the present date and time reaches the predetermined regular date and, time. Thus, the CPU 5 causes the wireless communication unit 6 to receive the roaming list again.

According to the embodiment, when the in-vehicle wireless communication device 2 fails in reception of the latest roaming list from the network 3 of the carrier from the beginning of the reception or in the course of the reception, the in-vehicle wireless communication device 2 transmits the update request to the network 3 of the carrier. In the present processings, opportunities to receive the latest roaming list from the network 3 of the carrier can be obtained. Thus, the CPU 5 is capable of appropriately updating the roaming list transmitted from the network 3 of the carrier without leaving the state, in which the in-vehicle wireless communication device 2 fails in reception of the latest roaming list from the beginning of the reception or in the course of the reception.

Moreover, an update request is transmitted to the network 3 of the carrier when reception of the latest roaming list transmitted from the network 3 of the carrier is unsuccessful in the course of the reception or from the beginning of the reception. In addition, an update request is also transmitted to the network 3 of the carrier when the roaming list update request is notified from the vehicle service center 4 to update the roaming list. Therefore, irrespective of a receiving state of the roaming list, an opportunity to receive the latest roaming list from the network 3 of the carrier can be obtained. Thus, the roaming list transmitted from the network 3 of the carrier can be appropriately updated.

The in-vehicle wireless communication device 2 may have at least one of:

as described in the case (2), the function of the CPU 5 performed when the in-vehicle wireless communication device 2 fails in reception of the roaming list in the course of the reception;

as described in the case (3), the function of the CPU 5 performed when the in-vehicle wireless communication device 2 fails in reception of the roaming list from the beginning of the reception; and as described in the case (4), the function of the CPU 5 performed when the in-vehicle wireless communication device 2 is notified of a request for updating a roaming list from the vehicle service center 4.

According to the in-vehicle wireless communication device, an updating state storing unit is configured to store an updating state, which indicates that:

reception of a latest roaming list, which is transmitted from the network, is successful to an end of the reception, and updating of the roaming list stored in the storing unit is completed; or reception of the latest roaming list, which is transmitted from the network, is unsuccessful in the course of the reception, and the roaming list stored in the storing unit is in the course of updating. The control unit is configured to determine the updating state stored in the updating state storing unit when the predetermined condition is satisfied, and the control unit is configured to: set the roaming list stored in the storing unit to be workable when determining that the updating state is in the completed mode, and cause the wireless communication unit to transmit an update request to the network when determining that the updating state is in the non-completed mode. The network of the carrier receives the update request, which is transmitted from the in-vehicle wireless communication device, in this manner, and thereby to transmit the latest roaming list to the in-vehicle wireless communication device, which originally transmitted the update request.

Thus, when the in-vehicle wireless communication device fails in reception of the latest roaming list from the network of the carrier in the course of the reception, the in-vehicle wireless communication device transmits the update request to the network of the carrier. Thereby, opportunities to receive the latest roaming list from the network of the carrier can be obtained. Thus, the roaming list transmitted from the network of the carrier can be appropriately updated without leaving the state, in which the in-vehicle wireless communication device fails in reception of the latest roaming list in the course of the reception.

In the above embodiment, the control unit is configured to set the roaming list stored in the storing unit to be workable when successfully receiving the latest roaming list, which is transmitted from the network of the carrier to the end of the reception and determining that the updating state is in the completed mode, and subsequently, the control unit is configured to cause the wireless communication means to transmit an update request to the network when a present date and time reaches a predetermined regular date and time.

Thus, opportunities to receive the latest roaming list from the network of the carrier can be obtained after the in-vehicle wireless communication device succeeds in reception of the latest roaming list from the network of the carrier to the end of the reception, every time when the present date and time reaches the regular date and time, irrespective of successful update or unsuccessful update of the roaming list. Thus, the roaming list transmitted from the network of the carrier can be appropriately updated.

According to the in-vehicle wireless communication device, an updating state storing unit is configured to store an updating state, which indicates that:

reception of a latest roaming list, which is transmitted from the network, is successful to an end of the reception, and updating of the roaming list stored in the storing unit is completed; or reception of the latest roaming list, which is transmitted from the network, is unsuccessful from the beginning of the reception, and the roaming list stored in the storing unit is not updated. The control unit is configured to determine the updating state stored in the updating state storing unit when the predetermined condition is satisfied, and the control unit is configured to: set the roaming list stored in the storing unit to be workable when determining that the updating state is in the completed mode, and cause the wireless communication unit to transmit an update request to the network when determining that the updating state is in the non-completed mode and the date and time reaches the regular date and time. The network of the carrier receives the update request, which is transmitted from the in-vehicle wireless communication device, in this manner, and thereby to transmit the latest roaming list to the in-vehicle wireless communication device, which originally transmitted the update request.

Thus, when the in-vehicle wireless communication device fails in reception of the latest roaming list from the network of the carrier from the beginning of the reception, the in-vehicle wireless communication device transmits the update request to the network of the carrier when the present date and time reaches the regular date and time. Thereby, opportunities to receive the latest roaming list from the network of the carrier can be obtained. Thus, the roaming list transmitted from the network of the carrier can be appropriately updated without leaving the state, in which the in-vehicle wireless communication device fails in reception of the latest roaming list from the beginning of the reception.

In the above embodiment, the control unit is configured to set the roaming list stored in the storing unit to be workable when successfully receiving the latest roaming list, which is transmitted from the network of the carrier to the end of the reception and determining that the updating state is in the completed mode, and subsequently, the control unit is configured to cause the wireless communication means to transmit an update request to the network when a present date and time reaches a predetermined regular date and time.

Thus, opportunities to receive the latest roaming list from the network of the carrier can be obtained after the in-vehicle wireless communication device succeeds in reception of the latest roaming list from the network of the carrier to the end of the reception, every time when the present date and time reaches the regular date and time, irrespective of successful update or unsuccessful update of the roaming list. Thus, the roaming list transmitted from the network of the carrier can be appropriately updated.

The control unit determines that the predetermined condition is satisfied in response to change in a state of an apparatus from a low-power-consumption state to a normal operation state, the change being caused by activation of a de-activated predetermined switch. Thereby, the updating state stored in the updating state storing unit can be determined at a time point when a state of an apparatus is changed from a low-power-consumption state to a normal operation state duet to activation of a de-activated predetermined switch.

The control unit is configured to cause the wireless communication unit to transmit an update request to the network when notified of a request for updating a roaming list from a vehicle service center. The network of the carrier receives the update request, which is transmitted from the in-vehicle wireless communication device, in this manner, and thereby to transmit the latest roaming list to the in-vehicle wireless communication device, which originally transmitted the update request.

The wireless communication unit transmits an update request to the network of a carrier in response to notification of an update request of a roaming list from a vehicle service center. Thereby, irrespective of successful update or unsuccessful update of a roaming list, opportunities to receive the latest roaming list transmitted from the network of a carrier can be obtained. Thus, the roaming list transmitted from the network of a carrier can be appropriately updated.

The wireless communication unit transmits an update request to the network of a carrier in response to notification of an update request of a roaming list from a vehicle service center. Thereby, irrespective of successful update or unsuccessful update of a roaming list, opportunities to receive the latest roaming list transmitted from the network of a carrier can be obtained. Thus, the roaming list transmitted from the network of a carrier can be appropriately updated.

The vehicle service center is configured to notify the in-vehicle wireless communication device of the request for updating a roaming list when acquiring failure information from the in-vehicle wireless communication device. Thus, at a time point when the vehicle service center acquires failure information from the in-vehicle wireless communication device, the roaming list transmitted from the network of a carrier to the in-vehicle wireless communication device can be appropriately updated.

The in-vehicle wireless communication device is configured to store the updating state of the latest roaming list transmitted from the network, and the vehicle service center is configured to notify the in-vehicle wireless communication device of the request for updating a roaming list, irrespective of the updating state of the latest roaming list stored in the updating state storing unit.

Thereby, irrespective of updating state of a latest roaming list, the roaming list transmitted from the network of a carrier to the in-vehicle wireless communication device can be appropriately updated.

The in-vehicle wireless communication device is configured to store the updating state of the latest roaming list transmitted from the network, and the vehicle service center is configured to notify the in-vehicle wireless communication device of the request for updating a roaming list when determining that the updating state of the latest roaming list stored in the updating state storing unit is in the non-completed mode. Thereby, when the updating state of the roaming list is in the non-completed mode, the roaming list transmitted from the network of a carrier to the in-vehicle wireless communication device can be appropriately updated.

The in-vehicle wireless communication device is configured to store the updating state of the latest roaming list transmitted from the network, and the vehicle service center is configured to notify the in-vehicle wireless communication device of the request for updating a roaming list when determining that the reception of the roaming list is unsuccessful from the beginning of the reception and the updating state of the latest roaming list stored in the updating state storing unit is in the non-completed mode.

Thereby, when the reception of the roaming list is unsuccessful from the beginning of the reception and the updating state of the latest roaming list is in the non-completed mode, the roaming list transmitted from the network of a carrier to the in-vehicle wireless communication device can be appropriately updated.

The above processings such as calculations and determinations are not limited being executed by the CPU 5. The control unit may have various structures including the CPU 5 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. An in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprising: a wireless communication unit configured to perform wireless communication with the network and receive a roaming list transmitted from the network;
   a storing unit configured to store the roaming list received by the wireless communication unit;
   a control unit configured to: cause the storing unit to store the roaming list transmitted from the network when the wireless communication unit receives the roaming list;
   set the roaming list stored in the storing unit to be workable in response to a determination that a predetermined condition is satisfied; and
   trace a wireless communication system, which the wireless communication unit is communicable with, using the roaming list, which is set to be workable;
   an updating state storing unit configured to store an updating state, which is in:
     a completed mode in which reception of a latest roaming list, which is transmitted from the network, is successful to an end of the reception, and updating of the roaming list stored in the storing unit is completed; or
     a non-completed mode in which reception of the latest roaming list, which is transmitted from the network, is unsuccessful in the course of the reception, and the roaming list stored in the storing unit is in the course of updating,
   wherein the control unit is configured to determine the updating state stored in the updating state storing unit when the predetermined condition is satisfied, and
   the control unit is configured to:
     set the roaming list stored in the storing unit to be workable when determining that the updating state is in the completed mode; and
     cause the wireless communication unit to transmit an update request to the network, when determining that the updating state is in the non-completed mode, to thereby cause the network to transmit the roaming list to the wireless communication unit;
   wherein the wireless communication unit is further configured to receive a request for obtaining failure information from the network, the control unit is further configured to obtain failure information in response to the request for obtaining failure information;
   the control unit is further configured to cause the wireless communication unit to transmit the update request and the obtained failure information to the network in response to the request to the network, when determining that the updating state is in the non-completed mode;

the wireless communication unit is further configured to receive a request for updating the roaming list, which is transmitted from the network in response to the update request and the obtained failure information; and the wireless communication unit is further configured to transmit a roaming list updating response to the request to the network thereby to cause the network to transmit the roaming list to the wireless communication unit.

2. The in-vehicle wireless communication device according to claim 1, wherein the control unit is configured to set the roaming list stored in the storing unit to be workable when determining that the updating state is in the completed mode, and subsequently, the control unit is configured to cause the wireless communication unit to transmit an update request to the network when a present date and time reaches a predetermined regular date and time.

3. The in-vehicle wireless communication device according to claim 1, wherein the control unit determines that the predetermined condition is satisfied in response to change in a state of an apparatus from a low-power-consumption state to a normal operation state, the change being caused by activation of a de-activated predetermined switch.

4. An in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprising: a wireless communication unit configured to perform wireless communication with the network and receive a roaming list transmitted from the network;

a storing unit configured to store the roaming list received by the wireless communication unit;

a control unit configured to: cause the storing unit to store the roaming list transmitted from the network when the wireless communication unit receives the roaming list;

set the roaming list stored in the storing unit to be workable in response to a determination that a predetermined condition is satisfied;

and trace a wireless communication system, which the wireless communication unit is communicable with, using the roaming list, which is set to be workable, an updating state storing unit configured to store an updating state, which is in: a completed mode in which reception of a latest roaming list, which is transmitted from the network, is successful to an end of the reception, and updating of the roaming list stored in the storing unit is completed; or a non-completed mode in which reception of the latest roaming list, which is transmitted from the network, is unsuccessful from the beginning of the reception, and the roaming list stored in the storing unit is not updated, wherein the control unit is configured to determine the updating state stored in the updating state storing unit when the predetermined condition is satisfied, and the control unit is configured to: set the roaming list stored in the storing unit to be workable when determining that the updating state is in the completed mode, and cause the wireless communication unit to transmit an update request to the network when determining that the updating state is in the non-completed mode and when a present date and time reaches a predetermined regular date and time, to thereby cause the network to transmit the roaming list to the wireless communication unit;

wherein the wireless communication unit is further configured to receive a request for obtaining failure information from the network, the control unit is further configured to obtain failure information in response to the request for obtaining failure information, the control unit is further configured to cause the wireless communication unit to transmit the update request and the obtained failure information to the network in response to the request to the network, when determining that the updating state is in the non-completed mode;

the wireless communication unit is further configured to receive a request for updating the roaming list, which is transmitted from the network in response to the update request and the obtained failure information, and the wireless communication unit is further configured to transmit a roaming list updating response to the request to the network thereby to cause the network to transmit the roaming list to the wireless communication unit.

5. The in-vehicle wireless communication device according to claim 4, wherein the control unit is configured to set the roaming list stored in the storing unit to be workable when determining that the updating state is in the completed mode, and subsequently, the control unit is configured to cause the wireless communication unit to transmit an update request to the network when the present date and time reaches the predetermined regular date and time.

6. The in-vehicle wireless communication device according to claim 4, wherein the control unit determines that the predetermined condition is satisfied in response to change in a state of an apparatus from a low-power-consumption state to a normal operation state, the change being caused by activation of a de-activated predetermined switch.

7. An in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprising:

a wireless communication unit configured to perform wireless communication with the network and receive a roaming list transmitted from the network;

a storing unit configured to store the roaming list received by the wireless communication unit;

a control unit configured to: cause the storing unit to store the roaming list transmitted from the network when the wireless communication unit receives the roaming list;

set the roaming list stored in the storing unit to be workable in response to a determination that a predetermined condition is satisfied; and trace a wireless communication system, which the wireless communication means is communicable with, using the roaming list, which is set to be workable, wherein the control unit is configured to cause the wireless communication unit to transmit an update request to the network in response to notification of a request for updating a roaming list from a vehicle service center, to thereby cause the network to transmit the roaming list to the wireless communication unit;

wherein the wireless communication unit is further configured to receive a request for obtaining failure information from the network, the control unit is further configured to obtain failure information in response to the request for obtaining failure information, the control unit is further configured to cause the wireless communication unit to transmit the update request and the obtained failure information to the network in response to the request to the network, when determining that the updating state is in the non-completed mode, the wireless communication unit is further configured to receive a request for updating the roaming list, which is transmitted from the network in response to the update request and the obtained failure information, and the wireless communication unit is further configured to transmit a roaming list updating response to the request to the network thereby to cause the network to transmit the roaming list to the wireless communication unit.

8. A roaming list updating system comprising:
the in-vehicle wireless communication device according to claim 7; and
the vehicle service center configured to send the notification of the request for updating a roaming list to the in-vehicle wireless communication device.

9. The roaming list updating system according to claim 8, wherein the vehicle service center is configured to send the notification to the in-vehicle wireless communication device when acquiring failure information from the in-vehicle wireless communication device.

10. The roaming list updating system according to claim 8, wherein the in-vehicle wireless communication device includes an updating state storing unit configured to store an updating state of a latest roaming list transmitted from the network, and
the vehicle service center is configured send the notification to the in-vehicle wireless communication device, irrespective of the updating state of the latest roaming list stored in the updating state storing unit.

11. The roaming list updating system according to claim 8, wherein the in-vehicle wireless communication device includes an updating state storing unit configured to store an updating state of the latest roaming list transmitted from the network,
the vehicle service center is configured to send the notification to the in-vehicle wireless communication device when determining that the reception of the latest roaming list is unsuccessful in the course of the reception, and the latest roaming list stored in the updating state storing unit is in the course of updating.

12. The roaming list updating system according to claim 8, wherein the in-vehicle wireless communication device includes an updating state storing unit configured to store the updating state of the latest roaming list transmitted from the network,
the vehicle service center is configured to send the notification to the in-vehicle wireless communication device when determining that the reception of the latest roaming list is unsuccessful from the beginning of the reception, and the latest roaming list stored in the updating state storing unit is not updated.

13. A method for updating a roaming list in an in-vehicle wireless communication device via wireless communication with a network of a carrier, the method comprising:
receiving a latest roaming list from the network;
storing an updating state, which is in:
i) a completed mode in which the receiving of the latest roaming list is successful to an end of the receiving; or
ii) a non-completed mode in which reception of the latest roaming list, which is transmitted from the network, is unsuccessful in the course of the reception;
determining whether the updating state stored is in the completed mode or the non-completed mode in response to a determination that a predetermined condition is satisfied;
setting the roaming list stored to be workable and tracing a communicable wireless communication system using the roaming list workable when determining that the updating state is in the completed mode;
and transmitting an update request to the network for receiving a latest roaming list from the network, when a result of the determining is that the updating state is in the non-completed mode, to thereby cause the network to transmit the roaming list to the wireless communication unit;
receiving a request for obtaining failure information from the network;
obtaining failure information in response to the request for obtaining failure information:
transmitting the update request and the obtained failure information to the network in response to the request to the network, when a result of the determining is that the updating state is in the non-completed mode;
receiving a request for updating the roaming list, which is transmitted from the network in response to the update request and the obtained failure information;
and transmitting a roaming list updating response to the request to the network thereby to cause the network to transmit the roaming list.

14. The method according to claim 13, further comprising:
determining whether a state of an apparatus is changed from a low-power-consumption state to a normal operation state in response to activation of a de-activated predetermined switch; and
determining that the predetermined condition is satisfied in response to determination that the state is changed from the low-power-consumption state to the normal operation state.

15. A method for updating a roaming list in an in-vehicle wireless communication device via wireless communication with a network of a carrier, the method comprising:
receiving a latest roaming list from the network;
storing an updating state, which is in:
i) a completed mode in which the receiving of the latest roaming list is successful to an end of the receiving; or
ii) a non-completed mode in which reception of the latest roaming list, which is transmitted from the network, is unsuccessful from the beginning of the reception, and the roaming list stored in the storing unit is not updated;
determining whether the updating state stored is in the completed mode or the non-completed mode in response to a determination that a predetermined condition is satisfied;
setting the roaming list stored to be workable and tracing a communicable wireless communication system using the roaming list workable when determining that the updating state is in the completed mode;
and transmitting an update request to the network for receiving a latest roaming list from the network, when a result of the determining is that the updating state is in the non-completed mode and when a present date and time reaches a predetermined regular date and time, to thereby cause the network to transmit the roaming list to the wireless communication unit;
receiving a request for obtaining failure information from the network;
obtaining failure information in response to the request for obtaining failure information;
transmitting the update request and the obtained failure information to the network in response to the request to the network, when a result of the determining is that the updating state is in the non-completed mode;

receiving a request for updating the roaming list, which is transmitted from the network in response to the update request and the obtained failure information;

and transmitting a roaming list updating response to the request to the network thereby to cause the network to transmit the roaming list.

16. The method according to claim 15, further comprising:

determining whether a state of an apparatus is changed from a low-power-consumption state to a normal operation state in response to activation of a de-activated predetermined switch; and determining that the predetermined condition is satisfied in response to determination that the state is changed from the low-power-consumption state to the normal operation state.

17. A method for updating a roaming list in an in-vehicle wireless communication device via wireless communication with a network of a carrier, the method comprising:

receiving a latest roaming list from the network;

determining whether a predetermined condition is satisfied;

setting the roaming list stored to be workable and tracing a communicable wireless communication system using the roaming list workable in response to a determination that a predetermined condition is satisfied; and transmitting an update request to the network for receiving a latest roaming list from the network in response to notification of a request for updating a roaming list from a vehicle service center, to thereby cause the network to transmit the roaming list to the wireless communication unit;

receiving a request for obtaining failure information from the network;

obtaining failure information in response to the request for obtaining failure information:

transmitting the update request and the obtained failure information to the network in response to the request to the network, when a result of the determining is that the updating state is in the non-completed mode;

receiving a request for updating the roaming list, which is transmitted from the network in response to the update request and the obtained failure information;

and transmitting a roaming list updating response to the request to the network thereby to cause the network to transmit the roaming list.

18. An in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprising:

a wireless communication unit configured to perform wireless communication with the network and receive a roaming list transmitted from the network;

a storing unit configured to store the roaming list received by the wireless communication unit;

a control unit configured to:

cause the storing unit to store the roaming list transmitted from the network when the wireless communication unit receives the roaming list;

set the roaming list stored in the storing unit to be workable in response to a determination that a predetermined condition is satisfied; and trace a wireless communication system, which the wireless communication unit is communicable with, using the roaming list, which is set to be workable;

an updating state storing unit configured to store an updating state, which is in:

a completed mode in which reception of a latest roaming list, which is transmitted from the network, is successful to an end of the reception, and updating of the roaming list stored in the storing unit is completed;

or a non-completed mode in which reception of the latest roaming list, which is transmitted from the network, is unsuccessful in the course of the reception, and the roaming list stored in the storing unit is in the course of updating, wherein the control unit is configured to:

set the updating state to the non-completed mode when the wireless communication unit begins receiving the roaming list transmitted from the network;

determine the updating state stored in the updating state storing unit when the predetermined condition is satisfied after the wireless communication unit begins receiving the roaming list transmitted from the network;

set the roaming list stored in the storing unit to be workable when determining that the updating state is in the completed mode;

and cause the wireless communication unit to transmit an update request to the network: when determining that the updating state is in the non-completed mode;

wherein the wireless communication unit is further configured to receive a request for obtaining failure information from the network, the control unit is further configured to obtain failure information in response to the request for obtaining failure information;

the control unit is further configured to cause the wireless communication unit to transmit the update request and the obtained failure information to the network in response to the request to the network, when determining that the updating state is in the non-completed mode;

the wireless communication unit is further configured to receive a request for updating the roaming list, which is transmitted from the network in response to the update request and the obtained failure information; and the wireless communication unit is further configured to transmit a roaming list updating response to the request to the network thereby to cause the network to transmit the roaming list to the wireless communication unit.

19. An in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprising:

a wireless communication unit configured to perform wireless communication with the network and receive a roaming list transmitted from the network;

a storing unit configured to store the roaming list received by the wireless communication unit;

a control unit configured to:

cause the storing unit to store the roaming list transmitted from the network when the wireless communication unit receives the roaming list;

set the roaming list stored in the storing unit to be workable in response to a determination that a predetermined condition is satisfied; and;

wherein the wireless communication unit is further configured to receive a request for obtaining failure information from the network, the control unit is further configured to obtain failure information in response to the request for obtaining failure information;

the control unit is further configured to cause the wireless communication unit to transmit the update request and the obtained failure information to the network in response to the request to the network, when determining that the updating state is in the non-completed mode;

the wireless communication unit is further configured to receive a request for updating the roaming list, which is transmitted from the network in response to the update request and the obtained failure information; and the wireless communication unit is further configured to transmit a roaming list updating response to the request to the network thereby to cause the network to transmit the roaming list to the wireless communication unit.

20. An in-vehicle wireless communication device configured to perform wireless communication with a network of a carrier, the network configured to transmit a latest roaming list to the in-vehicle wireless communication device in response to reception of an update request from the in-vehicle wireless communication device, the in-vehicle wireless communication device comprising:

a wireless communication unit configured to perform wireless communication with the network and receive a roaming list transmitted from the network;

a storing unit configured to store the roaming list received by the wireless communication unit;

a control unit configured to:
  set the updating state to be non-workable when the wireless communication unit begins receiving the roaming list transmitted from the network;
  cause the storing unit to store the roaming list transmitted from the network when the wireless communication unit receives the roaming list;
  set the roaming list stored in the storing unit to be workable in response to a determination that a predetermined condition is satisfied after the wireless communication unit begins receiving the roaming list transmitted from the network;
  and trace a wireless communication system, which the wireless communication means is communicable with, using the roaming list, which is set to be workable, wherein the control unit is configured to cause the wireless communication unit to transmit an update request to the network in response to notification of a request for updating a roaming list from a vehicle service center;

wherein the wireless communication unit is further configured to receive a request for obtaining failure information from the network, the control unit is further configured to obtain failure information in response to the request for obtaining failure information;

the control unit is further configured to cause the wireless communication unit to transmit the update request and the obtained failure information to the network in response to the request to the network, when determining that the updating state is in the non-completed mode;

the wireless communication unit is further configured to receive a request for updating the roaming list, which is transmitted from the network in response to the update request and the obtained failure information;

and the wireless communication unit is further configured to transmit a roaming list updating response to the request to the network thereby to cause the network to transmit the roaming list to the wireless communication unit.

* * * * *